United States Patent
Gupta et al.

(10) Patent No.: US 7,702,779 B1
(45) Date of Patent: Apr. 20, 2010

(54) SYSTEM AND METHOD FOR METERING OF APPLICATION SERVICES IN UTILITY COMPUTING ENVIRONMENTS

(75) Inventors: Charu Gupta, Menlo Park, CA (US); Parthasarthy Kopuru, Cupertino, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1022 days.

(21) Appl. No.: 11/139,229

(22) Filed: May 27, 2005

Related U.S. Application Data

(60) Provisional application No. 60/584,406, filed on Jun. 30, 2004.

(51) Int. Cl.
*G06F 15/173* (2006.01)
*G06F 15/177* (2006.01)

(52) U.S. Cl. .................. 709/224; 709/220
(58) Field of Classification Search ............ 709/220
See application file for complete search history.

(56) References Cited

U.S. PATENT DOCUMENTS

| | | | |
|---|---|---|---|
| 5,421,011 A * | 5/1995 | Camillone et al. | 718/104 |
| 6,615,092 B2 * | 9/2003 | Bickley et al. | 700/99 |
| 6,799,147 B1 | 9/2004 | Balasubramanian et al. | |
| 7,320,131 B1 * | 1/2008 | O'Toole, Jr. | 718/104 |
| 2004/0047354 A1 * | 3/2004 | Slater et al. | 370/400 |
| 2004/0199621 A1 | 10/2004 | Lau | |
| 2004/0267897 A1 * | 12/2004 | Hill et al. | 709/217 |
| 2005/0038867 A1 * | 2/2005 | Henderson et al. | 709/217 |
| 2005/0066026 A1 * | 3/2005 | Chen et al. | 709/224 |
| 2005/0091155 A1 * | 4/2005 | Pokta | 705/40 |
| 2005/0125314 A1 * | 6/2005 | Agarwal et al. | 705/30 |
| 2005/0132041 A1 * | 6/2005 | Kundu | 709/224 |

OTHER PUBLICATIONS

Albaugh, V., et al "The utility metering service of the Universal Management Infrastructure," IBM Systems Journal, vol. 43, No. 1, 2004.

* cited by examiner

*Primary Examiner*—Patrice Winder
*Assistant Examiner*—Minh-Chau Nguyen
(74) *Attorney, Agent, or Firm*—Meyertons, Hood, Kivlin, Kowert & Goetzel, P.C.

(57) ABSTRACT

A system for metering of application services in utility computing environments includes one or more meter agents and a meter aggregator. A meter agent may be configured to periodically collect usage data corresponding to one or more resources, and provide the usage data to the meter aggregator. The meter aggregator may be configured to aggregate the usage data associated with an application service, where the application service includes a plurality of application processes. In addition, the meter aggregator may be configured to compute a billing amount based on an aggregate resource usage by the application service over a specified time period.

20 Claims, 7 Drawing Sheets

Computer Readable Medium 700

Metering Software 710

FIG. 7

SYSTEM AND METHOD FOR METERING OF APPLICATION SERVICES IN UTILITY COMPUTING ENVIRONMENTS

This application claims the benefit of U.S. provisional patent application Ser. No. 60/584,406, entitled "Flexible Metering Support in Utility Computing Environments", filed Jun. 30, 2004.

BACKGROUND OF THE INVENTION

1. Field of the Invention

This invention relates to computer systems and, more particularly, to metering resource usage in utility computing environments.

2. Description of the Related Art

Many business organizations and governmental entities rely upon applications that access large amounts of data, often exceeding many terabytes of data, for mission-critical applications. Often, the costs of maintaining the computing and storage resources, as well as the software, required to support such applications may be substantial. Service organizations supporting the application may be required to accurately account for resource usage by different internal and external customers, so that the customers may be billed or charged according to their levels of resource consumption. Some enterprises are gradually moving away from maintaining traditional in-house data centers to leasing or renting resources in external data centers for at least a portion of their computing needs.

In response to the need for pay-per-use accounting of resource usage, a number of "utility computing models" have been developed, in which the use of computing resources such as processors and disks may be "metered" in the way traditional utilities such as electric power and water are metered. One difficulty with such models is the heterogeneity and complexity of mapping resource usage to specific users. Data centers may include hundreds or thousands of devices, any of which may be deployed for use with a variety of complex applications at different times. The resources being used by a particular application may change dynamically and rapidly, and may be spread over a large number of devices. A variety of existing tools and techniques may be available at each device to monitor usage—for example, different tools may be supported on mainframe computer systems than on UNIX-based servers or personal computers. The granularity at which resource usage measurement is possible may also differ from device to device; for example, in some environments, it may be possible to measure the response time of individual disk accesses, while in other environments only summaries or averages of disk access times may be obtained. The amount of resource usage data gathered from different sources via different interfaces, in different units and at different levels of granularity may be so large that it may become difficult to organize and use the data without a unifying framework.

In addition to the heterogeneity-related problems outlined above, the specific data presentation requirements of different customers and internal stakeholders may also have to be taken into account in utility computing environments. Each user may have a different perspective or preference on the manner in which resource usage data is aggregated, and on the units in which resource usage is represented and/or billed. In particular, some users may be interested in a presentation of the costs and resource usage at a business function level, e.g., in terms of specific application services provided, while other users may prefer the resource usage data in terms of individual application programs or at other granularities. Users may also be interested in obtaining different customized views of the same underlying resource usage data, for example, in the ability to drill down into the usage and cost data to identify the specific patterns of usage that are most expensive over a particular time period. A flexible, extensible framework for managing measurement and analysis of resource usage may help to satisfy the requirements of a variety of utility computing customers.

SUMMARY

Various embodiments of a system and method for metering of application services in utility computing environments are disclosed. According to a first embodiment, the system includes one or more meter agents and a meter aggregator. A meter agent may be configured to periodically collect usage data corresponding to one or more resources, and provide the usage data to the meter aggregator. The meter aggregator may be configured to aggregate the usage data associated with an application service, where the application service includes a plurality of application processes. In addition, the meter aggregator may be configured to compute a billing amount based on an aggregate resource usage by the application service over a specified time period. Thus, the meter aggregator may be configured to select the particular subset of usage data that corresponds to resources used by the processes of a specified application service, and generate a consolidated bill or invoice for the resources consumed on behalf of users of the application service. The applications or processes of the application service may be distributed across multiple hosts, and in some embodiments may move from one host to another over time. In embodiments where applications or processes migrate, or where new processes or applications are instantiated for a given application service over time, the meter aggregator may be configured to track the migration or instantiation of processes and associate the resource usage by the migrated or newly instantiated processes with the application service.

According to one embodiment, the application service may be organized as multiple logical tiers, such as, for example, a web server tier configured to receive requests from external users, an application server tier configured to receive requests from the web server tier, and a database tier configured to receive requests from the application server tier. In such an embodiment, the meter aggregator may be configured to provide separate aggregations of resource usage and/or separate billing amounts for each tier. Each tier may include a plurality of processes at one or more hosts in some embodiments, and processes belonging to multiple tiers may be co-located on a single host in other embodiments.

Usage data may be gathered on a variety of logical resources as well as on physical resources (such as CPUs and disks) in some embodiments. In one embodiment, the logical resources may include, for example, software licenses or data structures shared across multiple hosts. In some embodiments, the meter aggregator may be configured to provide one or more displays of the aggregated data, including, for example, a real-time display of resource usage aggregated for the application service. In one particular embodiment, the meter agents may be configured to periodically collect values for a set of attributes of the usage data, such as the specific user or user group to whom the resource usage over a specific time interval is to be attributed, the name and parameters of the command whose execution led to the resource usage, etc. The specific attributes for which values are collected may be identified in a meter specification in such embodiments. In response to a meter specification change request, the meter agent may be configured to dynamically modify the set of attributes for which values are being collected.

BRIEF DESCRIPTION OF THE DRAWINGS

FIG. 7 is a block diagram illustrating a computer readable medium according to one embodiment.

Figure 1:
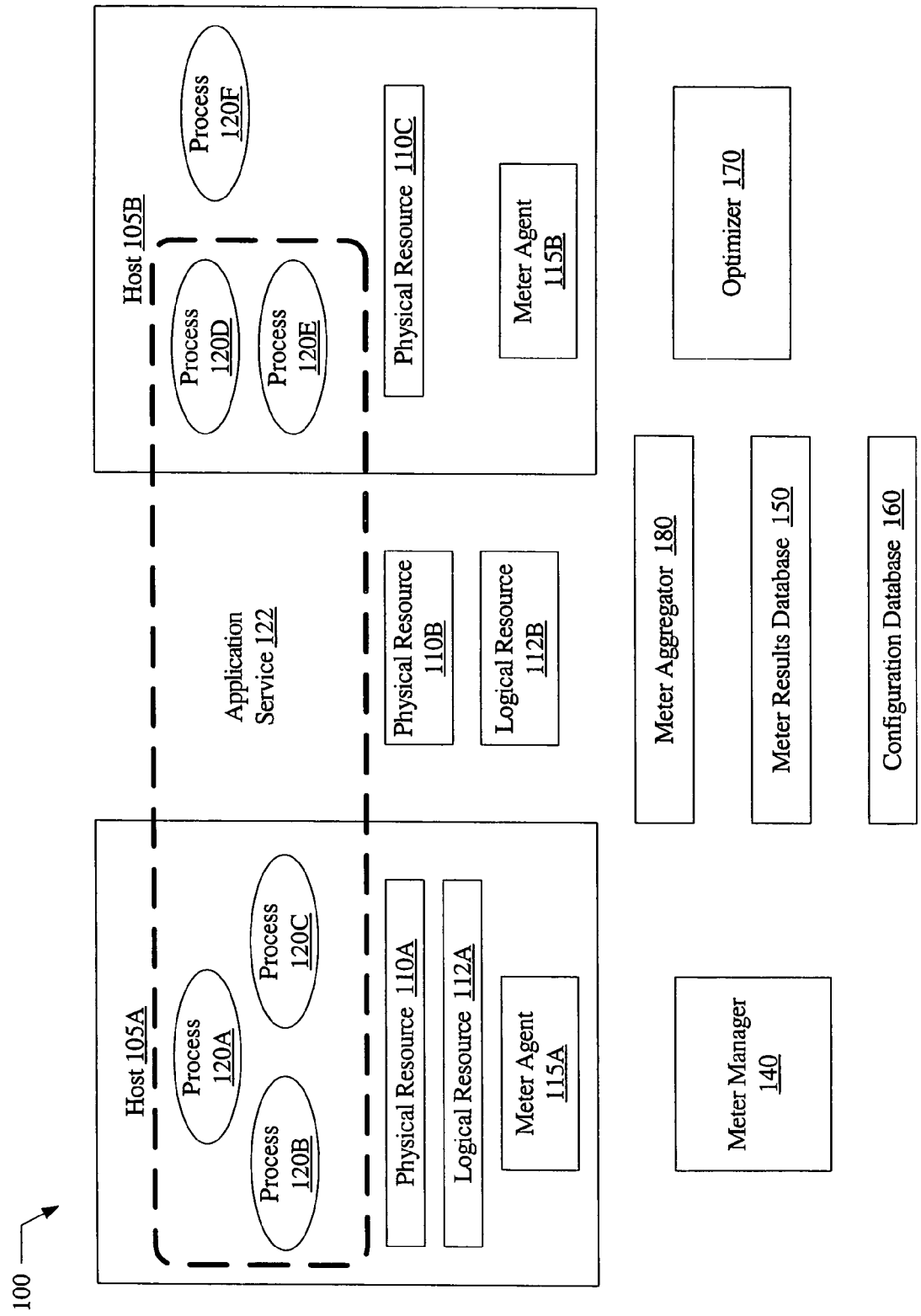
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. System 100 includes one or more meter agents, e.g., meter agent 115A at host 105A and meter agent 115B at host 105B (collectively, meter agents 115), and a meter aggregator 180. Meter agents 115 may be configured to collect usage data for one or more resources, e.g., to periodically collect measurement data quantifying the use of the resources. For example, meter agent 115A may be configured to collect data corresponding to the use of physical resources 110A and logical resource 112A by application processes 120A, 120B and 120C at host 105A, and metering agent 115B may be configured to collect data corresponding to the use of physical resource 110C by application processes 120D, 120E and 120F. As described below in further detail, in some embodiments a metering agent 115 may gather usage data for a particular resource using one or more dynamically loadable executable modules called meters. In addition, in some embodiments, metering agents 115A and 115B may be configured to collect usage data on shared resources such as physical resource 110B and logical resource 112B, which may also be accessed by application processes 120 at hosts 105A and/or 105B. Meter agents 115 may be configured to provide the collected data to meter aggregator 180. In some embodiments, meter agents 115 may be configured to save the collected data in a meter results database 150, and meter aggregator 180 may be configured to access the collected data from the meter results database. In other embodiments, meter agents 115 may also be configured to transmit at least some of the collected data directly to meter aggregator 180, either in addition to, or instead of, saving the results in meter results database 150.

Meter aggregator 180 may be configured to aggregate the usage data associated with one or more application services, e.g., according to service specifications identifying the component elements or processes of the application services, where at least one application service includes a plurality of processes. In general, an application service may represent any collection of data processing functionality aggregated from the perspective of a user or a set of users. In one environment, for example, an application service may represent an electronic auction site, while in another environment, an application service may represent an online magazine's Internet site. Multiple processes, often corresponding to more than one executable program, may together perform the functionality provided by an application service in some embodiments. For example, in the embodiment shown in FIG. 1, a service specification for application service 122 may indicate that processes 120A, 120B, 120C, 120D and 120E collectively provide the functionality supported by application service 122, and meter aggregator 180 may be configured to aggregate the data for the resources consumed by these application processes. In addition, meter aggregator 180 may be configured to compute one or more billing amounts based on the aggregated resource usage by each application service 122 over a specified time period. For application services 122 that are shared by multiple users or user groups, meter aggregator 180 may be configured to generate separate billing amounts for different user sets. In some embodiments, as described in further detail below, meter aggregators 180 may provide multiple views of the aggregated data and/or billing amounts, e.g., a first interface may be provided for viewing the aggregated data in real time (e.g., shortly after the usage data is collected by meter agents 115), while a second interface may be provided for long term aggregations or for obtaining invoices.

In addition to the meter agents 115 and meter aggregator 180, as shown in FIG. 1, in some embodiments system 100 may also include a meter manager 140, a configuration database 160 and an optimizer 170. Meter manager 140 may be configured to provide centralized configuration management for meter agents 115 and associated meters in some embodiments. For example, meter manager 140 may dynamically install or uninstall meters at a host 105, or dynamically reconfigure meters (e.g., by modifying one or more parameters controlling resource usage data collection, such as sampling rates, or by modifying the set of attributes for which values are collected by the meters). In one embodiment, meter manager 140 may also be configured to dynamically install, start, stop and uninstall meters as well as meter agents 115, and/or to maintain status information corresponding to each of the meter agents 115 in the system. The installation and instantiation of a new meter at a host 105 may be performed without interrupting existing operations such as ongoing measurements using meters that were previously installed at the host, e.g., without requiring a reboot of the host. In one embodiment, meter manager 140 may use an existing communication channel with a meter agent 115 to transmit required data and/or executables for a new meter to a host 105, and the new meter may be installed without requiring a login at the host.

Configuration database 160 may include a variety of configuration information on the hosts where resource usage is being monitored, meter agents 115, the specific meters installed at each host 105, etc. In one embodiment, meter agents 115 may be configured to use a particular communication protocol such as the Hyper Text Transfer Protocol (HTTP) to communicate with meter aggregator 180 and meter manager 140, and/or to use a JDBC (Java Data Base Connectivity) interface to store collected usage data in meter results database 150. In some embodiments, one or more protocols or APIs may be combined or encapsulated within other protocols in the communications between meter agents 115, meter manager 120, meter aggregator 140, configuration database 160 and meter results database 150. Various parameters associated with the communication protocol or protocols in use, such as protocol names/identifiers, host names, port numbers, security attributes and the like may be stored in configuration database 160. In one embodiment, configuration data and meter results may be stored within a single database, instead of a separate configuration database 160 and meter results database 150.

Meter specifications for various meters installed at hosts 105 may be stored in configuration database 160 in some embodiments. Meter specifications may include such parameters as the interface or function name of the meter (e.g., the name of the executable object invoked to collect the resource usage data), the type or name of the resource, the sampling rate or frequency of data collection, the units in which the collected data is to be expressed (e.g., seconds of CPU time for a meter collecting processor usage data), and names and locations of various files associated with the meter (such as a path to the file containing the executable object for the meter). In one embodiment, a meter specification may also include a set of attributes for which values may be collected at each measurement iteration, such as, for example, an identification of a user and/or a user group or project on whose behalf the resource is being used at the time the measurement is collected, a list of command line parameters and corresponding values for the application program being monitored, etc.

In one specific implementation, attribute values associated with or classifying users that have been pre-inserted in system configuration databases may also be collected with each measurement. For example, in one implementation, a system administrator may save user classification information (e.g., indicating that user "Joe" belongs to a "business_user" user class, while user "Jane" belongs to a "technical_user" user class) as a comment in each user's entry in a system configuration file (such as the "/etc/password" file on certain UNIX-based systems), and such comment values may also be collected along with each measurement associated with the user. If a process run on behalf of user "Joe" is found to use a processor during a particular time interval, the meter corresponding to the processor may also record the "business_user" comment along with the processor usage data. The collected comment fields may be used (e.g., by meter aggregator 180) to filter data for specific user groups in such an implementation. In one embodiment, the meter manager 140 may support the definition of custom or application-specific attributes, and values for the custom or application-specific attributes may also be collected. In some embodiments, it may be possible for the meter manager to dynamically modify the set of attributes for which data is being collected by a meter, for example in response to a meter specification change request, without interrupting an existing collection of data.

In some embodiments, meter manager 140 may be configured to install one or more meters at each host 105 by default, such as a CPU meter, a bandwidth meter and a disk meter. In response to a configuration command or upon an automatic detection of an event or condition, in one embodiment meter manager 140 may be configured to dynamically install one or more additional meters at a host, such as a meter to measure database transaction throughput or web page access response time. In another embodiment, meter manager 140 may be configured to provide an application programming interface (API) and/or a software development kit (SDK) to support the definition of custom meters, custom attributes, and/or to provide bridges between existing resource measurement tools (such as the "sar" and "iostat" tools on Unix systems and the "perfmon" tool on systems using a version of Microsoft Corporation's Windows™ operating system). Using such an API or SDK, users may, for example, develop new meters specifically designed for particular applications or resources of interest, modify existing meters, and store meter specifications for the new meters in configuration database 160. The API or SDK may also provide utilities for common metering functions such as input file creation and logging.

Some meters may be deployable on any host 105, while others may be useful only on specific subsets of hosts 105 or other devices present in the system. For example, in one implementation, a meter may be designed to monitor usage of write caches at disk arrays of a particular type (e.g., disk arrays from a particular vendor). Such a meter may be installed and used only at devices or hosts which have access to such write caches, and a method or function that allows meter manager 140 to determine whether the meter is compatible with a targeted host 105 or device may also be identified in the configuration information for the meter stored within the configuration database 160. Some meters may be configured to gather usage data for resources that may be shared across multiple hosts 105, such as shared storage devices, networks, or logical structures such as database tables, software licenses etc. In some embodiments, meters may be configured to gather usage data on virtualized resources, such as distributed virtual storage devices (e.g., mirrored or striped logical volumes) that represent logical aggregations of physical storage distributed across multiple storage devices. Virtualized resources may be distributed across multiple hosts and/or multiple devices connected via networks. In some embodiments, a single meter may be configured to gather data on a distributed virtualized resource, while in other embodiments several different meters may collectively gather usage data on the components of the virtualized resource.

In computing or preparing billing amounts for a particular application service 122, meter aggregator 180 may be configured to use any of a number of different billing models or billing plans in different embodiments. In some embodiments, for example, a transaction-based billing model may be used, where, for example, a user or group of users of the application service may be charged a fixed fee per transaction (where the set of transaction types covered by the billing model may be defined or specified in a service level agreement). In other embodiments, a flat fee for an agreed-to base amount of resource usage (e.g., CPU time) may be charged, while any excess use over the base amount may be charged at a different rate. In one embodiment, billing rates may vary based on the time of the day or the day of the week—e.g., to reflect higher contention for resources during normal office hours, a higher rate may be charged for resource use during office hours than during evening or weekend hours. Not all resources of a particular type may be billed at the same rate in one embodiment: for example, CPU usage for a high-end processor may be billed at a higher rate than CPU usage for a low-end processor, and disk usage at an intelligent and fault-tolerant disk array may be billed at a higher rate than disk usage at a low-end disk. Different billing rates for the same resource may be used for different customer sets in some embodiments—e.g., high-volume customers may get charged a lower amount per unit of resource consumed than low-volume customers.

Billing models may also include a variety of other features in other embodiments, such as discounts for large volumes, variable pricing based on auctions, and the like. In one auction-based billing model, for example, users may bid for the ability to use an application service with specified performance levels during specified future time periods, and one or more auction winners or high bidders may be guaranteed the ability to utilize the resources supporting the application service during the future time periods. Meter aggregator 180 may be configured to compute billing amounts based on the auction winners' bids in such embodiments. The level of billing detail provided by meter aggregator 180 may vary in different embodiments. For example, in one embodiment, meter aggregator 180 may provide a breakdown of the billing amount based on broad categories of resource types, such as CPU usage, network usage, disk usage and software usage, while in another embodiment, meter aggregator 180 may allow users to drill down to such details as the specific times at which various resources were used at a particular host.

In some embodiments, meter aggregator 180 may also be configured to break down billing amounts for specific users or user groups separately: for example, separate billing details may be provided for a human resources department and a finance department within a corporation. Depending on the classification of users into groups for billing purposes, a specific use of a resource (e.g., the use of a particular CPU during the period 10 A.M. to 11 A.M. on a particular day) may be associated with more than one group—e.g., the usage may be included in a department-level summary, and also included in an individual user level report. In one embodiment, billing amounts may be associated with high-level metrics of resource usage such as "delivered computing minutes (DCM)" and "delivered software minutes (DSM)". The DCM metric may be used to simplify the presentation of the usage of processors, disks and/or network bandwidth using a single unit, for example, and the DSM metric may similarly be used to simplify the presentation of software license usage.

The usage data gathered by various meter agents 115 may be stored in meter results database 150 in some embodiments. A flexible and extensible database schema may be used to store the data, so that changes to meter specifications or meter attributes may be accommodated without having to restart the database. An extensible schema may also be used for configuration database 160, allowing new types of devices and hosts to be added to the set of monitored devices without requiring existing schemas to be replaced. In some embodiments, filter specifications used to select specific subsets of gathered data may also be stored in either configuration database 160 or meter results database 150. Such stored filter specifications may be used, for example, to quickly extract desired views of the data without having to formulate new queries each time.

Resource usage data gathered by meter agents 115 may also be used to assist in redeployment or migration of applications from one set of hosts or resources to another in some embodiments. Such redeployments may, for example, help data center administrators make more efficient and cost-effective use of the available resources. In one embodiment, optimizer 170 may be provided with a set of constraints associated with a deployment of one or more application processes 120 or application services 122, such as, for example, a desired maximum processor utilization level at a target execution environment, a requirement that two or more application processes of the application service must be co-hosted at a single server or host 105, or a maximum desired processor cost. Details of resources available at one or more target execution environments (e.g., the number and types of resources such as processors, disks, etc., and the configurations in which the resources are arranged, such as clusters, shared memory multiprocessors, etc.) may also be provided to optimizer 170. In addition, optimizer 170 may be configured to obtain one or more filtered aggregations of resource usage data gathered by meter agents 115 for the applications to be redeployed, e.g., an aggregation indicating the processor utilization as measured at an existing execution environment where the application processes 120 or application service 122 has been running.

Using the filtered aggregations of resource usage data, the information on resources at possible target execution environments and the desired set of constraints, optimizer 170 may be configured to generate mappings of the application processes 120 and/or the application service 122 to selected resources of the target execution environments in some embodiments. For example, if an application service includes two application processes 120A and 120B that have been running on separate hosts 105A and 105B, respectively, optimizer 170 may indicate that in order to reduce overall processing cost as specified in a specified constraint, processes 120A and 120B may both be executed at single low-cost multiprocessor server 105K. Optimizer 170 may implement a number of different types of models to generate the mappings of applications to target resources in different embodiments, such as one or more integer programming models or other mathematical programming models. It is noted that in some embodiments, optimizer 170 may be optional (i.e., optimizer 170 may not be included in system 100 in such embodiments).

Figure 2:
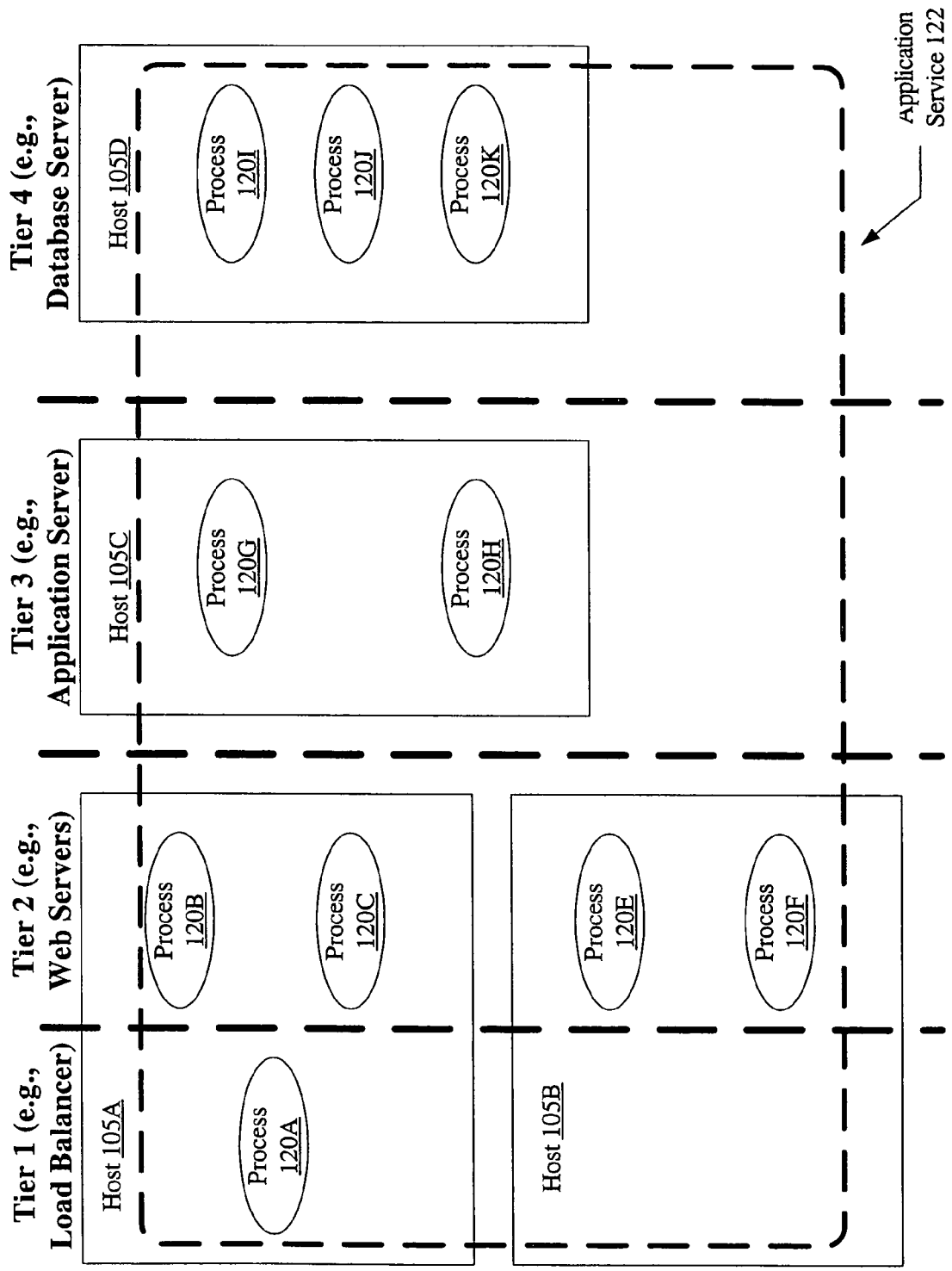
FIG. 2 is a block diagram illustrating an exemplary multi-tiered application service, according to one embodiment.

As noted above, meter aggregator 180 may be configured to aggregate resource usage data for an application service 122, e.g., according to a service specification, in some embodiments. A service specification may, for example, identify a set of one or more executable programs whose corresponding processes 120 collectively provide the application service. In one embodiment, a service specification may also specify how the application programs or processes 120 may be logically organized as application tiers, and may indicate that separate resource usage data and/or separate billing information be generated by meter aggregator 180 for each application tier. FIG. 2 is a block diagram illustrating an exemplary multi-tiered application service, according to one embodiment. The illustrated example application service 122 includes four tiers: a load balancer tier, a web server tier, an application server tier, and a database tier. Each tier may represent a logically separate function supported by the application service 122. The load balancer tier (Tier 1 of FIG. 2) may, for example, be configured to accept incoming requests from clients over a network such as the Internet, and distribute the requests to one or more processes (e.g., 120B, 120C, 120E and 120F) of the web server tier (Tier 2). In some embodiments, a hardware load balancer may be used, while in other embodiments such as the embodiment shown in FIG. 2, a load balancer application process 120A may be used. The processes of the web server tier may in turn be configured to transform the client requests into application server requests and send the application server requests to the application server tier (Tier 3), where, for example, one or more instances of an application server such as WebSphere™ from the IBM Corporation or Weblogic™ from BEA Corporation may be executed. In turn, depending on the nature of the original client request, a particular application server request may result in one or more requests to the back-end database server tier (Tier 4). Responses to the client requests may be returned from the database server tier to the application server tier, from the application server tier to the web server tier and from the web server tier to the clients.

In general, each tier may comprise a plurality of processes and/or devices, and meter aggregator 180 may be configured to aggregate resource usage for (and/or provide billing amounts for) each tier separately. Processes corresponding to more than one executable application program may be included within a given tier. The processes 120 corresponding to various tiers may be distributed among numerous hosts 105 in some embodiments, as desired; for example, a single host (such as 105A in FIG. 2) may include processes corresponding to multiple tiers, while the processes of a given tier may be distributed across multiple hosts (e.g., processes of the Web Server tier may be distributed across hosts 105A and 105B in FIG. 2). In some embodiments, processes 120 of a given tier may move from host to host as needed (e.g., in order to better balance load, or in response to failures), and/or new processes for a particular tier may be started at one or more hosts 105 of the system. Meter aggregator 180 may be configured to detect process movements and new process instantiations, and continue to aggregate resource usage data for the moved or new processes along with the resource usage data for other processes of the tier in such embodiments. In some embodiments, resource usage data for different tiers may be gathered using executable program names: e.g., resources used by processes of program A may represent Tier 1 usage, resources used by processes of programs B and C may represent Tier 2 usage, etc.

In one embodiment, meter aggregator 180 and/or meter manager 140 may be configured to periodically poll meter agents 115 (e.g., send queries or requests to meter agents 115) at different hosts 105 in order to determine whether new processes or migrated processes corresponding to a particular application service or tier are running at the hosts. In another embodiment, meter aggregator 180 and/or meter manager 140 may be configured to communicate directly with an application service 122 (e.g., with a configuration manager process of the application service) to identify the current set of processes at various tiers of the application service. In one specific embodiment, meter aggregator 180 and/or meter manager 140 may be configured to provide a notification interface and/or to register for notifications of configuration changes for an application service 122; e.g., meter aggregator 180 or meter manager 140 may be automatically notified by the application service via the notification interface when specified events such as process movements or new process instantiations occur. In response to a detection of an instantiation (or migration) of an application service process at a host where no meter agent is currently running, in one embodiment meter aggregator 180 may be configured to request meter manager 140 to install a meter agent 115 at the host. In some embodiments, billing rates may differ for each tier of a multi-tier application service; e.g., CPU usage at a database tier may be billed at a different rate than CPU use at a web server layer. It is noted that some application services 122 may comprise only a single tier or a single process 120 in some embodiments.

Figure 3:
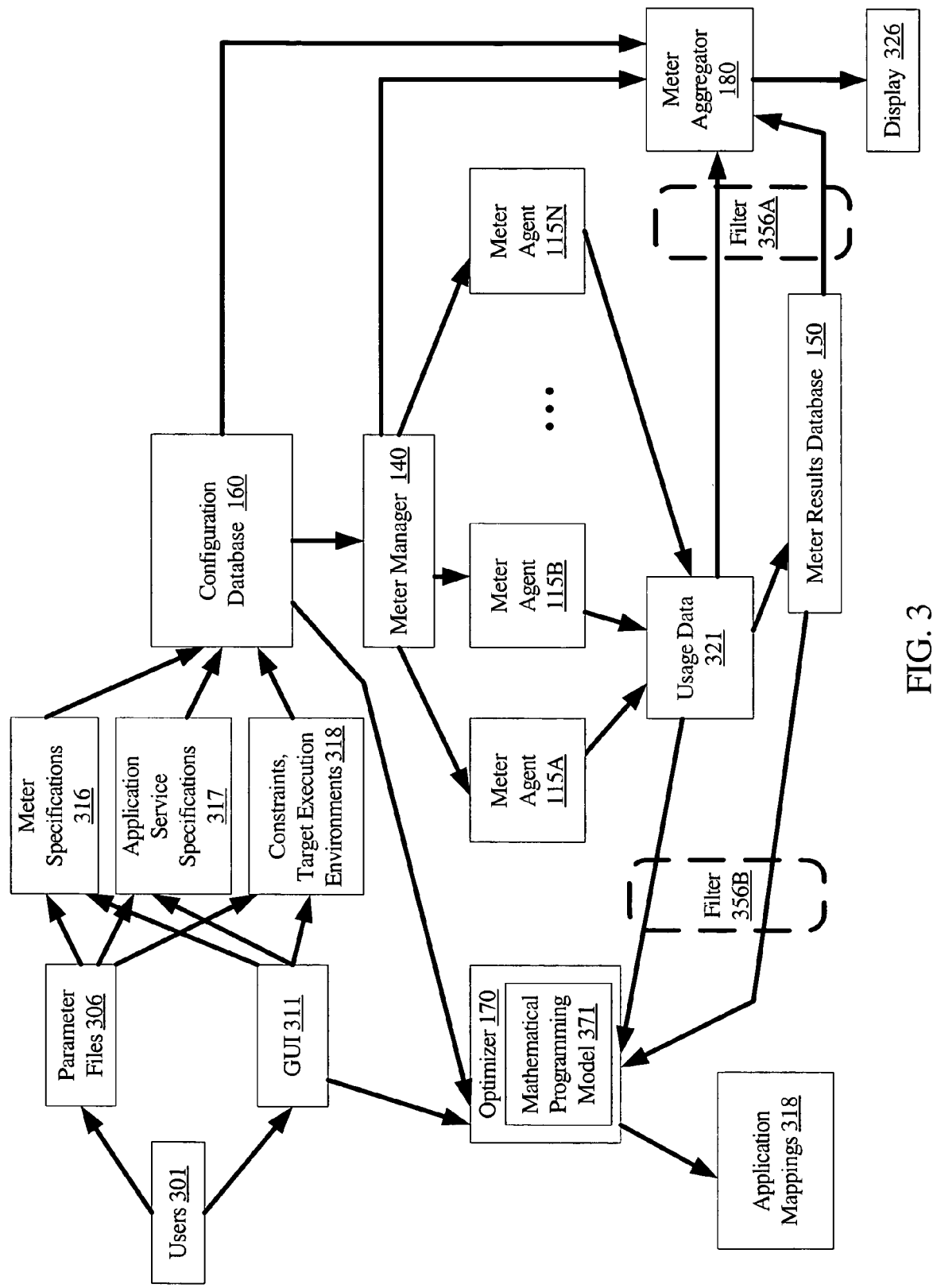
FIG. 3 is a block diagram illustrating aspects of the flow of data between various components of a system according to one embodiment.

FIG. 3 is a block diagram illustrating aspects of the flow of data between various components of system 100 according to one embodiment. As shown, users 301 (such as data center managers, information technology managers, or system administrators) of system 100 may provide input such as meter specifications 316, service specifications 317 and constraint sets and target execution environment specifications 318. Users 301 may provide the input via one or more graphical user interfaces 311, parameter files 306, or by command line interfaces not shown in FIG. 3 in various embodiments. The specifications provided by the users may be stored in configuration database 160 in one embodiment. Meter manager 140 may be configured to distribute meter specifications from configuration database 160 to meter agents 115 in some embodiments, while in other embodiments, meter agents 115 may be configured to obtain meter specifications directly from configuration database 160.

Meter agents 115 may be configured to periodically collect usage data for one or more resources according to the meter specifications, and to provide the usage data to meter aggregator 180. In some embodiments, the meter agents may be configured to store the usage data within meter results database 150, and meter aggregator 180 may be configured to obtain usage data from meter results database 150. Meter aggregator 180 may also be configured to obtain application service specifications from configuration database 160 and/or from meter manager 140, and may use the service specifications to filter usage data (e.g., using a filter specification 356A) to aggregate resource usage for application services 122. Filter specification 356A may be used to select resource usage data associated with the processes of a particular application service 122, e.g., based on process names, user or group names etc. Meter aggregator 180 may also be configured to compute billing amounts based on the aggregated usage data for the application service 122, and provide one or more views of the aggregated usage data and/or the billing amounts via display 326. In some embodiments, meter aggregator 180 may be configured to dynamically display real-time aggregated resource usage data (e.g., for specified time windows such as the last hour, the last day, etc.) for one or more application services 122 via one or more displays 326. The real-time aggregated resource usage data display may also allow users to view a breakdown of the data by resource or resource type, by user or user group, by application service tier, etc.

As described earlier, in some embodiments optimizer 170 may be configured to provide mappings of applications or application services to one or more resources at target execution environments according to specified sets of constraints. In some embodiments, users 301 may identify the applications or application services targeted for possible redeployment and provide part or all of the constraint sets and/or the specifications of target execution environments to optimizer 170, e.g., via one or more GUIs 311. In other embodiments, optimizer 170 may receive the constraint sets and/or the target execution environment specifications from configuration database 160, either directly or via meter manager 140. In order to generate the requested mappings, optimizer 170 may be configured to obtain past resource usage data for the applications, e.g., in order to help solve a set of linear or non-linear equations using a mathematical programming model 371. The past resource usage data may be obtained as a filtered aggregation of resource usage data gathered by meter agents 115, either directly from the meter agents 115 or from meter results database 150. Filter specification 356B may be used by optimizer 170 to select the specific usage data needed to generate the mappings—e.g., filter specification 356B may include identifiers of the application programs to be potentially redeployed, as well as one or more time ranges, identifiers of resources of interest, etc. Using the filtered resource usage data, the specifications of the target execution environments, and the constraints to be met, optimizer 170 may generate one or more mappings 318 of the applications to resources of the target execution environment, e.g., by solving equations of mathematical programming model 371.

Figure 4:
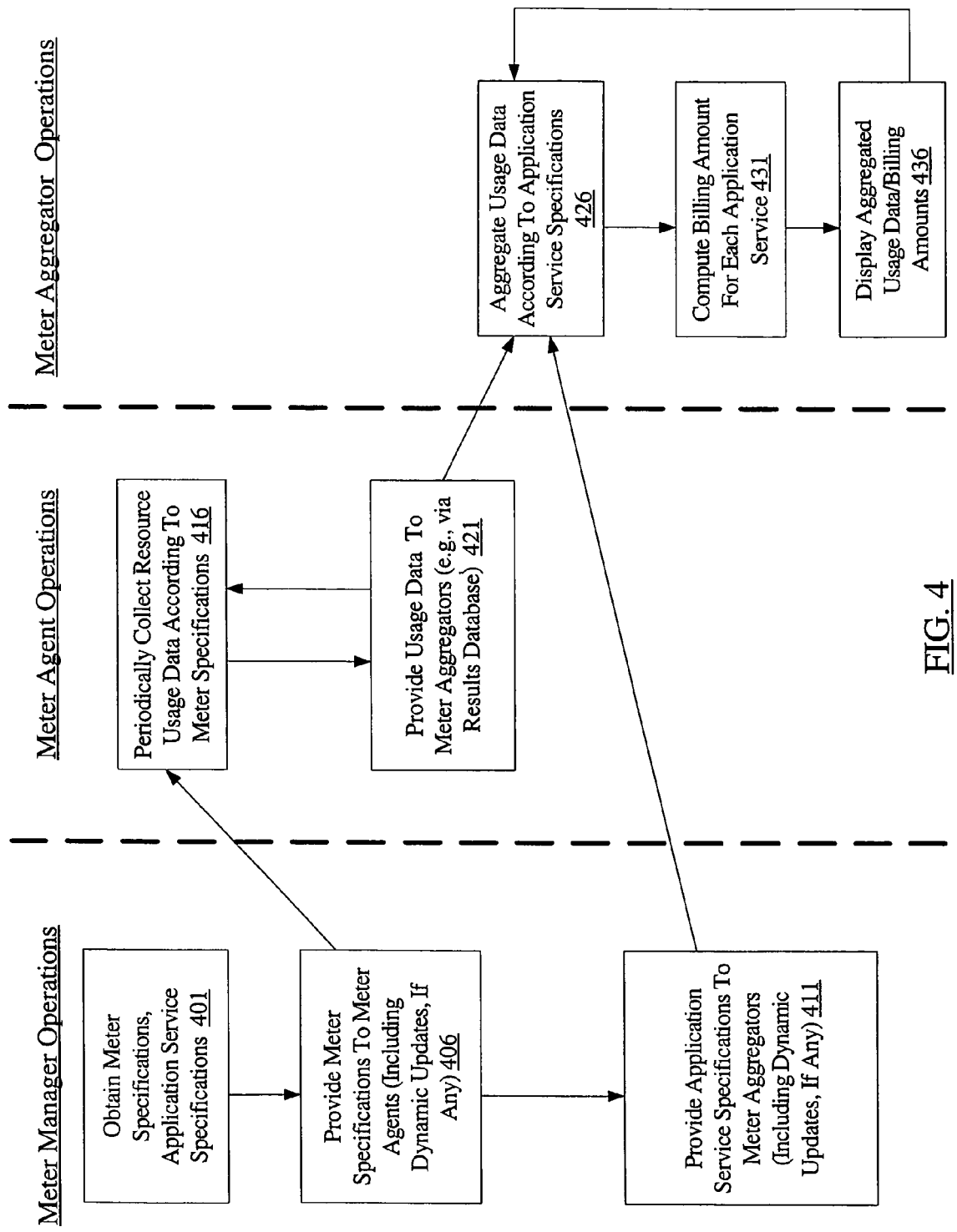
FIG. 4 is a flow diagram illustrating aspects of the operation of a meter manager, meter agents and a meter aggregator, according to one embodiment.

FIG. 4 is a flow diagram illustrating aspects of the operation of meter manager 140, meter agents 115 and meter aggregator 180, according to one embodiment. As shown in block 401, meter manager 140 may be configured to obtain meter specifications and/or application service specifications, e.g., from users via one or more interfaces such as input parameter files or GUIs. The meter specifications may include, for example, identifications of resources to be monitored, measurement parameters such as intervals between successive measurements, units in which measured usage is to be expressed, interfaces or programs to be used to obtain the measurements, attributes for which values have to be obtained for each measurement, etc. Meter manager 140 may be configured to distribute the meter specifications to one or more meter agents 115 (block 406). In addition, meter manager 140 may also be configured to provide application service specifications to meter aggregator 180 (block 411).

In one embodiment, meter manager 140 may also be configured to dynamically update meter specifications, e.g., in response to user input, and distribute the updated meter specifications to meter agents 115. Upon receiving a modified meter specification, in such embodiments a meter agent 115 may be configured to apply the modifications—e.g., if the updated meter specification specifies a different inter-measurement interval than the existing inter-measurement interval, the meter agent 115 may be configured to modify its inter-measurement interval accordingly. A modified meter specification may also specify different attributes to be gathered with each measurement data point in some embodiments. For example, in some embodiments, values for attributes such as user names, group names, project names, command-line parameters, etc. may be gathered by a meter agent 115 along with each measurement data point. The specific set of attributes for which data is being gathered may be dynamically modified as a result of a modification to the meter specification. Similarly, application service specifications may also be modified dynamically and provided to meter aggregator 180 by meter manager 140 in some embodiments. A change in an application service specification may include, for example, an identification of one or more new application programs whose process instances 120 may be included within a specified tier of an application service 122, or a new tier definition.

On receiving a meter specification, meter agent 115 may be configured to periodically gather resource usage data according to the specification (block 416 of FIG. 4). In one embodiment, meter manager 140 may be configured to activate meter agent 115 to start resource usage data collection for one or more meter specifications; e.g., meter manager 140 may be capable of separately starting and stopping resource usage data collection corresponding to individual meter specifications at one or more meter agents. In some embodiments, a meter agent may be configured to provide the collected usage data to one or more meter aggregators 180 (block 421 of FIG. 4), either by direct communication with the meter aggregators or by saving the collected usage data in a meter results database 150 from which the meter aggregators 180 may read the usage data.

Meter aggregator 180 may be configured to aggregate resource usage data gathered by usage meters 115 according to the application service specifications (block 426), so that, for example, billing amounts may be computed separately for each application service 122 or each application service tier (block 431). In addition, meter aggregator 180 may be configured to provide one or more displays of the aggregated usage data and/or computed billing amounts (block 436) for one or more application services.

Figure 5:
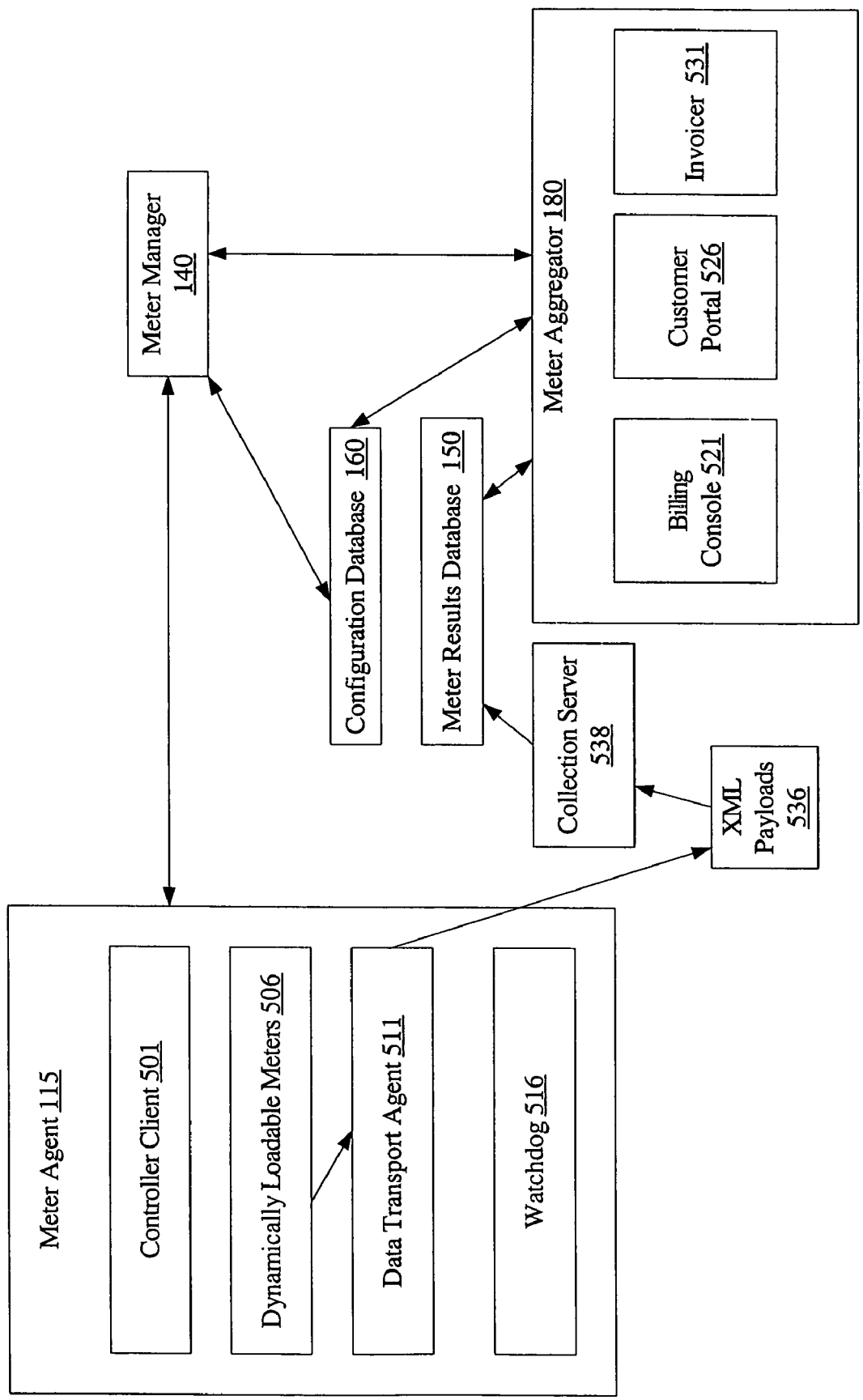
FIG. 5 is a block diagram illustrating exemplary meter agent components and meter aggregator interfaces according to one embodiment.

FIG. 5 is a block diagram illustrating exemplary components of meter agents 115 and meter aggregator interfaces, according to one embodiment. As shown, meter agent 115 may include a controller client 501, one or more dynamically loadable meter modules 506, a data transport agent 511 and a watchdog process 516. Meter aggregator 180 may be configured to provide three different interfaces in the illustrated embodiment: a billing console 521, a customer portal 526 and an invoicer 531. As described below, the architecture illustrated in the embodiment of FIG. 5 may support the automation of scheduling resource usage data collection, reliably delivering and/or saving measured data in standard formats (e.g., using XML), and detecting and recovering from problems or errors.

Controller client 501 may be configured to communicate with meter manager 140 on behalf of the meter agent 115, using any of a variety of communication protocols.

In one embodiment, one or more TCP/IP (Transport Control Protocol/Internet Protocol) connections may be used for communication between controller client 501 and meter manager 140. Meter manager 140 may be configured to send meter specifications, dynamic updates to existing meter specifications, commands to dynamically install or load new meters 506 as described below, commands to start and stop measurements corresponding to one or more meter specifications, etc., to controller clients 501 for various meter agents 115 in system 100. As noted earlier, dynamically loadable meter modules 506 may be used to gather resource usage measurements. In some embodiments, the meters 506 may be configured to use existing monitoring or performance tools (e.g., "sar" or "iostat" in UNIX-based systems) provided by operating systems, database management systems, web servers or application servers, while in other embodiments, custom code may be used to gather the resource usage data. By encapsulating diverse sources of resource usage data using common meter specification and deployment techniques and interfaces, it may be possible to hide vendor-specific and device-specific details and provide a uniform view of the metering infrastructure. In some embodiments a set of default meters may be provided for gathering usage data for resources such as CPUs, disks and network bandwidth, while custom meters may be designed for application-specific resources such as database locks, specific web pages at a web site, etc. In some embodiments, meter manager 140 may provide an application programming interface (API) or a software development kit (SDK) that may allow users to design and/or code the custom meters, e.g., using one or more scripting languages (such as Perl) and/or programming languages (such as C, C++, C#, or Java). Each meter module may have an associated meter specification identifying specific resources to be monitored using the meter, as well as measurement parameters such as measurement sampling rates, attributes for which values are to be gathered for each measured data point, etc.

A data transport agent 511 may be configured to package and transmit resource usage data gathered by the meters in some embodiments. In one embodiment, for example, data transport agent 511 may format the resource usage data according to a standard such as XML, and send XML payloads 536 to a collection server 538. In one implementation, data transport agent 511 may use HTTP (Hyper Text Transmission Protocol) to send resource usage data to collection server 538. Other protocols may be used in other implementations. Collection server 538 may save the resource usage data in meter results database 150, e.g., using JDBC (Java Data Base Connectivity) or any other appropriate interface or protocol. In some embodiments, a single collection server 538 may be configured to receive resource usage data from multiple meter agents 115. In such embodiments, the collection server 538 may be configured to batch resource usage data before inserting it into the meter results database 150— e.g., to gather resource usage data from multiple meter agents 115 over an interval such as ten seconds, and submit the gathered data to meter results database 150 in a single operation. In other embodiments, a plurality of collection servers 538 may be configured to receive resource usage data from one or more meter agents 115. In one such embodiment, a load balancer may be used to distribute incoming messages containing the resource usage data across the plurality of collection servers.

A watchdog process 516 may be configured to monitor the state of other components of the meter agent 115 in one embodiment. For example, in one implementation, the watchdog process 516 may be configured to periodically exchange messages with the controller client 501 and with data transport agent 511 to verify that these components are operational. In another embodiment, watchdog process 516 may also be configured to check that one or more meter modules 506 are functioning as expected, e.g., by verifying that the data being transmitted by data transport agent 511 to collection server 538 includes contributions from all the activated meters, or by directly interacting with the meter modules 506. In some implementations, watchdog processes 516 from different meter agents 115 at different hosts 105 may be configured to periodically exchange status messages (which may also be termed heartbeat messages), so that a failure of a particular host 105 or meter agent 115 may be detected at another host or meter agent. In response to a detection of a failure, watchdog processes 516 may be configured to initiate a variety of corrective actions in different embodiments. For example, in one embodiment, if watchdog process 516 detects a failure of a component of its local meter agent 115 (such as data transport agent 511), the watchdog process 516 may be configured to restart the failed component. In another embodiment, watchdog process 516 may be configured to report any detected failures (including failures detected at another host 105 or another meter agent 115) to meter manager 140, and/or to save indications of the detected failures in one or more log files.

As described above, meter aggregator 180 may be configured to aggregate resource usage data corresponding to an application service, and to compute billing amounts associated with the aggregated resource usage by the application service. In some embodiments, meter aggregator 180 may be configured to use a variety of interfaces to display or provide different views of the aggregated resource usage data and the billing amounts and/or to receive inputs such as details of billing plans. For example, an invoicer 531 may be configured to generate invoices for various customers based on their respective billing plans in one embodiment. Customers or users of application services 122 may be provided a view of their respective usage data via a customer portal 526 in some embodiments. For example, in one embodiment a user may be able to log in to a web-based customer portal 526 and submit queries to answer questions such as "How much CPU did I use over the last week for application service A?" or "On what days or hours did I use the most bandwidth for application service B over the last month?" Billing console 521 may be used by administrators to provide details of specific customer billing plans for different application services to meter aggregator 180. For example, in one embodiment, billing plan details provided via billing console 521 may include an identification of specific users or user groups for whom a combined billing amount is to be generated, the specific billing rates for various resources associated with an application service, etc. In some embodiments, billing console 521 may also allow users to view their current or past billing amounts. The components and interfaces shown in FIG. 5 may be used at a variety of devices and hosts in heterogeneous data center environments, where for example, the set of hosts 105 and physical and logical resources may be provided by different vendors. For example, the customer portal 526 and/or billing console 521 may hide vendor-specific details such as operating system differences between hosts 105, and may provide uniform, vendor-neutral views of the system and/or the data gathered or computed.

As described earlier, meter agent 115 may be configured to collect usage data for a variety of different resources, including physical resources and/or logical resources. Physical resources may include, for example, processors or CPUs, main memory (e.g., RAM), disks, disk arrays, other storage devices such as storage appliances and switches, network cards, etc. Logical resources may include, for example, software licenses, database tables, indexes, web pages, instantiations of entities such as Enterprise Java Beans (EJBs), JDBC calls, SQL operations and stored procedures, etc. For example, in one embodiment where an application service includes a web server tier, an application server tier, and a database tier, one or more meter agents 115 may be configured to monitor the number of web pages accessed (e.g., via HTTP "GET" operations) and the average amount of data retrieved per access at the web server tier, the number of EJBs activated at the application server tier, and the number of SQL operations such as selects and joins at the database tier, as well as the concurrent number of licensed users of the database tier.

In some embodiments, a meter agent 115 or meter aggregator 180 may also be configured to correlate usage data for different types of resources and/or to compute derived metrics (i.e., metrics that may not be measurable directly using a meter module 506). For example, in on embodiment, meter aggregator 180 may be configured to obtain web page access counts, database SQL operation counts, and disk I/O operations corresponding to use of a particular application service over a specified period, and derive metrics such as "average disk I/O per SQL operation" or "average disk I/O per web page access". Such derived metrics may be used in some embodiments by application service experts to tune parameters of the application (e.g., by adding caches or increasing cache sizes at various layers of the system, or by relocating frequently accessed data to faster storage devices) to improve overall application service performance. In some embodiments, meter aggregator 180 may also be configured to provide hints that identify bottleneck resources—e.g., in one implementation where utilization levels of a number of devices are being monitored, meter aggregator 180 may be configured to identify the resources with the highest utilizations and/or longest queue lengths as potential bottleneck resources. The resource usage data gathered by meter agents 115 may be used for a variety of purposes in different embodiments: e.g., for consolidation or migration of applications as described below, for capacity planning, trend analysis, etc. In some embodiments, the resource usage data may be used as input for policy engines that may, for example, be configured to ensure that enterprise-wide information technology policies (e.g., policies on minimum resource utilization levels required to justify continued maintenance of a data center) are followed.

Often, and especially as advances in technology make new and more powerful computing devices more affordable, it may be possible to redeploy portions of existing application services to new execution environments (e.g., new hosts, new storage devices, etc.) where they may be executed at an overall lower cost without reducing the quality of service provided to users, or where the quality of service may be improved without a major impact on cost. It may also be possible to consolidate two or more existing applications or application services onto less expensive portions of existing execution environments than are currently being used, where for example a single server may provide enough computation capabilities to support both an application server tier and a database tier. In some enterprise environments, consolidation of services across remote data centers (e.g., data centers in different cities) may also be possible. Many different choices may in general be available for redeployment and/or consolidation, and many different constraints may have to be taken into account when making decisions to redeploy or consolidate applications and application services. In particular, in some embodiments, it may be important to ensure that the new execution environment be capable of supporting a desired level of performance. Optimizer 170 may be configured to utilize existing performance data such as resource usage data gathered by meter agents 115 to help make redeployment or consolidation decisions.

Figure 6:
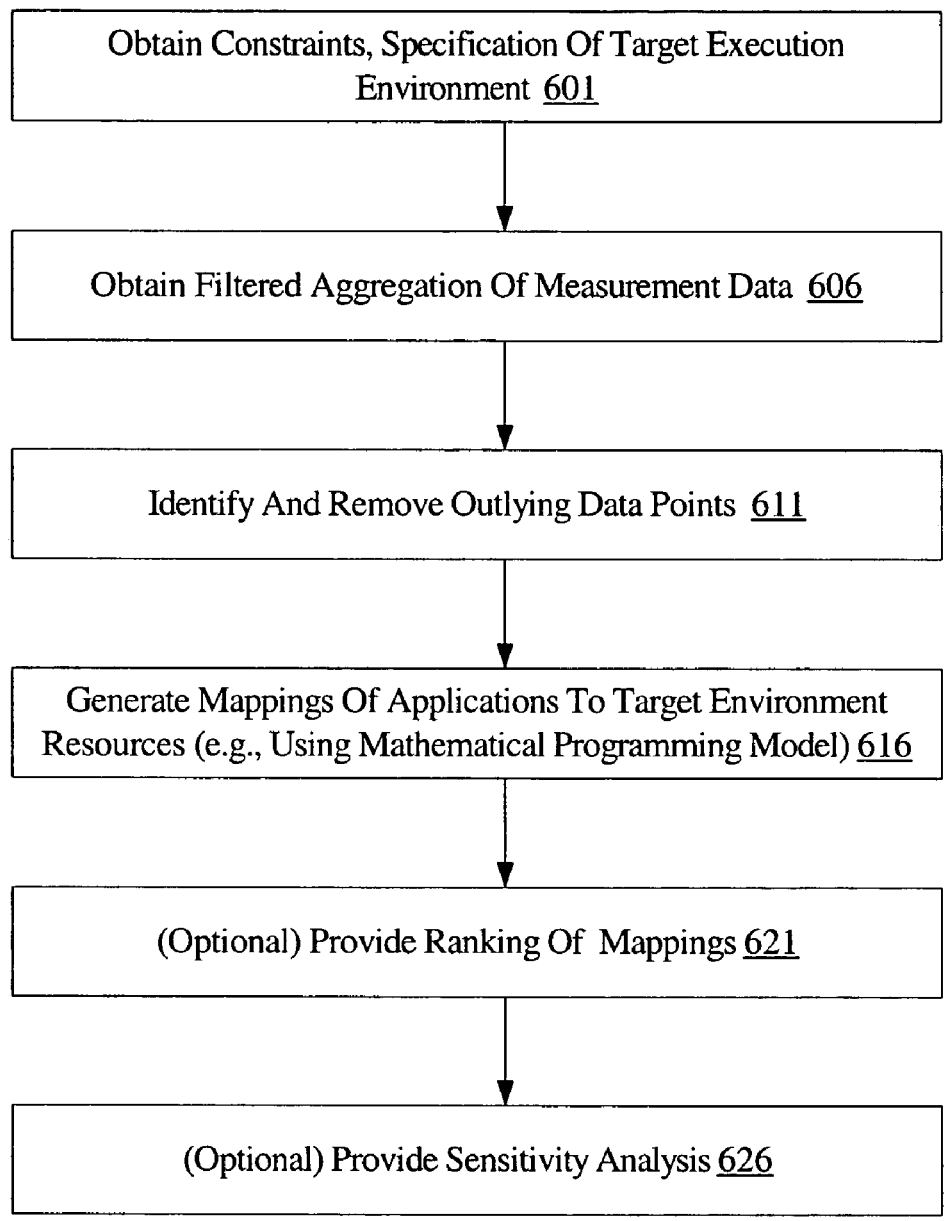
FIG. 6 is a flow diagram illustrating aspects of the operation of optimizer 170 according to one embodiment.

FIG. 6 is a flow diagram illustrating aspects of the operation of optimizer 170 according to one embodiment. As shown in block 601 of FIG. 6, optimizer 170 may be configured to receive or obtain a set of constraints as well as specifications of target execution environments to be considered for redeployment or consolidation. Target execution environments may include any desired combination of devices and resources, including, for example, hosts 105, storage devices and networks in one embodiment, where one or more application processes or components of an application service may be deployed. A variety of different constraints may be specified to optimizer 170 in different embodiments. Performance constraints may include, for example, utilization constraints, throughput constraints and response time constraints. Utilization constraints may be specified to identify the targeted maximum utilization levels of various resources (e.g., "the CPU utilization at any server shall not exceed 75%") in some embodiments. Throughput constraints may specify desired minimum throughputs for specified transaction types (e.g., "the system must be capable of supporting at least 100,000 stock quote queries per hour during normal operation and at least 10,000 stock quote queries per minute for peak usage minutes"). Response time constraints may specify desired maximum response times for specified operations (e.g., "a response to a search query for a product should take no more than 0.5 seconds").

Application grouping and isolation constraints may be specified to indicate allowable or desired grouping of application processes 120 in other embodiments. For example, one grouping constraint may require that for an application service including a web server tier and a database tier, web server tier processes be run on servers with at most two processors, while database tier processes be run on eight-processor servers. Isolation constraints may indicate restrictions on where two or more processes or applications may be deployed together—for example, one isolation constraint may indicate that no web server process be run on the same server as a database process, or that a database server from vendor DB-A may not be run on the same host as a database server from vendor DB-B. In one embodiment, security constraints may designate the required security levels for different application service components or processes—e.g., database processes may be required to be executed on hosts 105 that cannot be accessed by external users over the Internet, while web servers may be required to be executed on hosts that can be accessed by external users. In some embodiments, physical constraints and/or infrastructure constraints may also be specified—e.g., the maximum allowable data center space to be occupied by the targeted execution environment may be indicated in a physical constraint, and the maximum allowable power consumption by the devices of the target execution environment may be specified as an infrastructure constraint. In one embodiment, availability or reliability constraints may also be specified—e.g., a reliability constraint may specify that database data has to be stored in redundant storage, or that critical applications must be deployed in failover-capable configurations. Any suitable format or language may be used to specify the constraints. Software license constraints may also be specified—e.g., some software products restrict the number of hosts on which the product may be concurrently deployed, or the number of client systems from which users can concurrently access the software.

In some embodiments, optimizer 170 may be configured to obtain specifications of target execution environments based on user input—e.g., users 301 may provide the specifications via one or more parameter files 306 or through a GUI 311, as indicated in FIG. 3. In the embodiment shown in FIG. 3, the specifications (as well as constraint sets) may be stored in configuration database 160, and extracted or received from the configuration database by optimizer 170. In other embodiments, the specifications may be provided by users 301 directly to optimizer 170 (i.e., without the intermediate step of saving the specifications in a database). In one embodiment, optimizer 170 may be configured to search a configuration database 160 for specifications on various hosts 105 and devices within the data center—that is, instead of receiving explicit specifications of target execution environments, optimizer 170 may be configured to assume that all hosts and devices identified in configuration database 160 are potential target resources for redeployment or consolidation. The specifications of target execution environments may include, for example, host processor specifications (e.g., clock speeds of various processors at the different hosts 105), main memory sizes, cache sizes, storage device, capacities and speeds (e.g., average, minimum and maximum seek times and rotational latencies for disk devices), network card specifications (e.g., whether an Ethernet network interface card is a 100 Mbit/sec card or a Gbit/sec card), operating system identifications, lists of installed software, etc. Costs for each host and device may also be included in the specifications in some embodiments. In one embodiment, each device may have a device type associated with it (e.g., all hosts may be classified as belonging to a "HOST" type, all storage devices may be classified as belonging to a "STORAGE" type, etc.) and one or more normalization factors allowing comparisons of different devices of the same type may be included in the specifications. For example, a normalization factor indicating that a single processor host from vendor P1 is twice as powerful as a single processor host from vendor P2 may allow optimizer 170 to consider two P2 hosts as being equivalent in processing capability as one P1 host when generating application mappings. The processors of the two hosts, may, for example, represent different generations of microprocessor technology, where the first host's processor has a higher clock speed and/or faster average memory access time than the second host's processor. Similarly, normalization factors for different processors from the same vendor may also be used, allowing a set of older (and typically slower) processors to be replaced by an appropriate number of newer (and typically faster) processors as needed.

As shown in block 606 of FIG. 6, optimizer 170 may be configured to obtain filtered aggregations of resource usage measurement data for the applications that may be targeted for redeployment or consolidation, e.g., from meter results database 150 in one embodiment. The resources corresponding to the filtered aggregations may be termed "source resources" herein, to distinguish them from the resources of the target execution environments, which may be termed "target resources". It is noted that the same resource may be both a source resource and a target resource; that is, one or more resources already in use for the applications may also be considered a candidate resource for future use. The filtered aggregations may provide data on the current or past resource requirements of the applications that may be redeployed or consolidated, and may be used by optimizer 170 to predict possible future resource use in some embodiments. That is, using an appropriate set of filters, the optimizer 170 may be able to obtain an accurate estimate of each application's resource usage requirement from the underlying raw measurements collected by meter agents 115. In one embodiment, a number of different filtered aggregations or profiles of usage measurement data may be obtained—e.g., a first profile of resource usage aggregated over the hours of a day, a second profile aggregated over the days of a week, and so on, to allow optimizer 170 to determine resource consumption trends over time instead of, for example, generating application mappings based on a snapshot of resource consumption at a particular point of time. In addition to filtering based on time periods, in some embodiments the measurement data may also be filtered based on values of attributes (such as user names, group names, command names, etc.) collected with each measurement. For example, in one embodiment a Boolean combination of attribute-value pairs may be used as a filtering criterion. The filtered resource usage measurement data may be used by optimizer 170 to determine the resource requirements of the applications or application services to be redeployed: e.g., based on CPU usage data and transaction throughput data for a database application, optimizer 170 may determine that each transaction requires an average of 1 millisecond of CPU time on a particular processor. Optimizer 170 may use such resource requirements to generate alternate mappings of the application to resources of a target execution environment. In one specific embodiment, optimizer 170 may also be configured to detect outlying data points in the aggregated measurement data—that is, data points that represent extreme high or low values for the metric being collected, and do not reflect typical measurement trends. Optimizer 170 may be configured to ignore such outlying data points from the aggregated measurement data in some embodiments (box 611 of FIG. 6).

Using the specifications of the target execution environments and the filtered aggregation of resource usage data, optimizer 170 may be configured to generate one or more mappings of applications or application services 122 to specific resources in a target execution environment in accordance with the specified constraints (block 616 of FIG. 6). For example, in one embodiment where a target execution environment includes two hosts 105K and 105L, and the application service to be redeployed includes two processes 120A and 120B, the optimizer 170 may indicate several possible mappings of the processes to the hosts that meet the specified constraints, such as "deploy both processes 120A and 120B to host 105K" or "deploy both processes 120A and 120B to host 105L". In generating the mappings, in some embodiments the optimizer 170 may be configured to utilize a mathematical programming model 371 (as shown in FIG. 3). For example, in one implementation, optimizer 170 may be configured to generate a set of equations representing an objective function or functions to be minimized (such as total cost) or maximized (such as expected performance) given the capabilities of the target execution environment's resources and the other constraints that have to be met. In such an implementation, one or more solutions of the equation set may provide the mappings of applications to resources of the target execution environment. In one embodiment, the variables in the equations may be restricted to having integer values—i.e., the mathematical programming model may be an integer programming model.

In some embodiments, if more than one mapping that satisfies the constraint set is generated, optimizer 170 may also be optionally configured to rank the mappings relative to each other based on one or more specified criteria (block 621 of FIG. 6) and/or identify the optimal mapping solution. For example, in one embodiment the mappings may be ranked based on the particular objective function being minimized (e.g., cost) or maximized (e.g., expected performance), and the best mapping obtained by the optimizer based on the particular objective function may be identified. The mappings may also be ranked based on other factors such as total power consumption, total physical space used, etc. In some embodiments, users may be allowed to specify a maximum time to be taken by optimizer 170 in computing the mappings, and the optimizer 170 may be configured to provide the best mapping it has found in the specified time limit. In some embodiments, optimizer 170 may also be configured to provide sensitivity analysis for the mappings (block 626 of FIG. 6)—e.g., to identify how a mapping might have to be modified if a constraint is relaxed or made stricter, and to quantify the costs and/or benefits of such a mapping modification. For example, in one implementation where a utilization constraint mandates a maximum desired CPU utilization of 70%, an initial mapping generated by optimizer 170 may suggest a deployment of an application A to a host 105K and a deployment of an application B to two hosts 105L and 105M. If the utilization constraint were changed to a maximum desired CPU utilization of 65%, however, application B may have to be deployed to three hosts 105L, 105M and 105N. In this example, optimizer 170 may be configured to indicate the sensitivity of its original mapping to the utilization constraint by indicating that a change from 70% to 65% desired maximum utilization may require an additional host to be used.

Optimizer 170 may be configured to provide tabular and/or graphical output illustrating the various application mappings generated in some embodiments. The output of the optimizer may also be saved in any of a number of formats (e.g., text or HTML) for later analysis or comparison. In some embodiments, optimizer 170 may be configured to compute and report on the specific cost savings that may be possible by the elimination of certain servers. In some data centers, the operations illustrated in FIG. 6 may be initiated in response to specific user or administrator requests, while in other embodiments, optimizer 170 may be configured to periodically perform the operations automatically—e.g., to look for possible cost improvements once every week or once every month, without explicit requests. Results of such continuous optimization operations may be automatically sent to one or more specified users, e.g., via e-mail. In one embodiment, optimizer 170 may also be used for predictive analysis or capacity planning. For example, instead of allowing the optimizer to identify one or more mappings of application components to resources based on specified constraints, a user may specify a potential mapping, and a component of optimizer 170 may be configured to provide estimates of one or more performance metrics (such as achievable transaction throughput) on the specified target devices of the potential mapping based on an analysis of filtered resource usage data.

It is noted that the granularity of application redeployment or migration mappings may differ from one embodiment to another. In some embodiments, for example, optimizer 170 may be configured to generate mappings at an application service level: e.g., to suggest target resources for all the component programs or application of an application service. In other embodiments, optimizer 170 may be configured to consider and generate mappings for specific applications or for application process rather than considering redeployment of entire application services. In one embodiment, e.g., in response to a request to generate mappings for a set of applications or application processes, optimizer 170 may be configured to provide mappings for as many applications or application processes as possible; i.e., a best effort mapping of one or more applications rather than a complete mapping of the entire set may be provided by optimizer 170.

FIG. 7 is a block diagram illustrating a computer accessible medium 700, according to one embodiment. Computer accessible medium 700 may include metering software 710 which, when executed, provides the functionality of meter agents 115, meter aggregator 180, meter manager 140 and optimizer 170 as described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, all the components of metering software 710 may be packaged within a single software module. In other embodiments, one or more components of metering software 710 may be packaged as independent software modules. It is noted that in some embodiments, at least a portion of the functionality of meter manager 115, meter aggregator 180 or optimizer 170 may be performed in firmware or hardware.

Hosts 105 may include one or more processors coupled to one or more memories, as well as one or more I/O interfaces such as storage adapters allowing access to storage I/O channels, network interface cards, a mouse, keyboard and other peripherals. The one or more processors may be implemented using any desired architecture or chip set, such as the SPARC™ architecture from Sun Microsystems or the x86-compatible architectures from Intel Corporation, Advanced Micro Devices, etc. The one or more memories may be implemented using any appropriate medium such as any of various types of RAM (e.g., DRAM, SDRAM, RDRAM, SRAM, etc.). In some embodiments, the operating system in use at a first host 105A may differ from the operating system in use at a second host 105B. Physical resources 110 may include a variety of devices such as processors, network devices and interface cards, and any of a number of different types of physical storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a plurality of host computers, each of which includes a processor coupled to memory, wherein each of at least two of the plurality of host computers stores program instructions executable to implement one of a plurality of application processes, wherein the plurality of application processes are included within an application service;
wherein each of the at least two host computers stores program instructions executable to implement a respective one of a plurality of meter agents;
wherein one of the plurality of host computers stores program instructions executable to implement a meter aggregator;
wherein each of the plurality of meter agents includes program instructions executable on a respective one of the at least two host computers to:
collect usage data indicative of usage, by one or more of the plurality of application processes, of one or more resources of the respective host computer; and
provide the collected usage data to the meter aggregator; and
wherein the meter aggregator includes program instructions executable to:
aggregate the usage data provided by each of the plurality of meter agents, wherein the aggregated usage data is indicative of aggregate usage of the one or more resources of each of the at least two host computers by at least two of the plurality of application processes within the application service; and
compute a billing amount for the application service based on the aggregated usage data;
wherein one of the plurality of host computers stores program instructions executable to implement a meter manager configured to provide centralized management for the plurality of meter agents;
wherein the meter manager includes program instructions executable to dynamically install meter agents on one or more of the plurality of host computers in response to a configuration command.

2. The system of claim 1, wherein the application service is for a first web site.

3. The system of claim 2, wherein the plurality of host computers are configured to implement a plurality of web sites including the first web site and a second web site, and wherein the billing amount for the application service for the first web site does not include resource usage for the second web site.

4. The system as recited in claim 1, wherein the application processes include a first tier of application processes configured to receive service requests from users and a second tier of application processes configured to receive service requests from the first tier, and wherein the meter aggregator further includes program instructions executable to aggregate resource usage by the first tier and aggregate resource usage by the second tier.

5. The system as recited in claim 1, wherein each of the plurality of meter agents includes program instructions executable to periodically collect usage data corresponding to one or more physical resources or one or more logical resources of the system.

6. The system as recited in claim 1, wherein each of the plurality of meter agents includes program instructions executable to periodically collect usage data corresponding to one or more software licenses.

7. The system as recited in claim 1, wherein the meter aggregator includes program instructions executable to provide a real-time display of the aggregated usage of the one or more resources of each of the at least two host computers by at least two of the plurality of application processes within the application service.

8. The system as recited in claim 1, wherein each of the plurality of meter agents includes program instructions executable to:
collect values for a set of attributes associated with the usage data in accordance with a meter specification; and
in response to a meter specification change request, dynamically modify the set of attributes for which values are collected.

9. A method, comprising:
monitoring an application service including a plurality of application processes running on a plurality of computers each having one or more resources, including:
a first one of the plurality of computers dynamically installing meter agents on each of at least two of the plurality of computers in response to a configuration command, wherein the first computer is configured to provide centralized management for a plurality of meter agents;
receiving usage data at the first one of the plurality of computers, wherein the usage data is received from each of the at least two of the plurality of computers, and wherein for each of the at least two computers, the usage data is indicative of usage of one or more resources of that computer by one or more of the plurality of application processes running on that computer; and
the first computer aggregating the received usage data for the application service;
wherein the aggregated usage data is usable to compute a billing amount for the application service.

10. The method as recited in claim 9, wherein the application service includes a plurality of tiers, including a first tier of application processes in the plurality of application processes configured to receive service requests from users and a second tier of application processes in the plurality of application processes configured to receive service requests from the first tier, the method further comprising:
providing a first aggregation of resource usage by the first tier and a second aggregation of resource usage by the second tier.

11. The method as recited in claim 9, wherein the one or more resources include a software license.

12. The method as recited in claim 9, further comprising:
periodically collecting values for a set of attributes associated with the usage data received from one of the at least two of the plurality of computers in accordance with a meter specification; and
in response to a meter specification change request, dynamically modifying the set of attributes for which values are collected.

13. The method of claim 9, further comprising:
displaying, in substantially real time, aggregated e usage data for the application service.

14. The method of claim 9, further comprising computing a billing amount for the application service based, at least in part, on the aggregated usage data.

15. A computer readable medium having program instructions stored thereon that are executable on a first computer within a computer system having a plurality of computers to:
monitor an application service including a plurality of application processes running on the plurality of computers, including:
receiving usage data from each of at least two of the plurality of computers, wherein for each of the at least two computers, the usage data is indicative of usage of one or more resources of that computer by one or more of the plurality of application processes running on that computer; and
aggregating the received usage data for the application service; and
implement a meter manager configured to provide centralized management for a plurality of meter agents and dynamically install meter agents on one or more of the plurality of computers in response to a configuration command.

16. The computer readable medium as recited in claim 15, wherein the one or more resources include a physical resource and a logical resource.

17. The computer readable medium as recited in claim 15, wherein the instructions are further executable to:
periodically collect values for a set of attributes associated with the usage data received from one of the at least two computers in accordance with a meter specification; and
in response to a meter specification change request, dynamically modify the set of attributes for which values are collected.

18. The computer readable medium as recited in claim 15, wherein the program instructions are further executable to:
suggest a reallocation of resources used by the application service such that the reallocation results in a reduction of aggregated resource usage for at least one type of resource used by the application service.

19. The computer readable medium as recited in claim 15, wherein the application service is the collective functionality for operating a first web site.

20. The computer readable medium of claim 15, wherein the instructions are further executable to compute a billing amount for the application service based, at least in part, on the aggregated usage data.

* * * * *